DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED SEPTEMBER 3, 1974

926 O.G. 10

T926,005

PROCESS FOR RAPIDLY CURING UNSATURATED POLYESTER MOLDING COMPOSITIONS WHEREIN THE UNSATURATED POLYESTER IS PREPARED FROM 2,2,4-TRIMETHYL-1,3-PENTANEDIOL

John R. Dombroski, 124 Bloomingdale, Apt. E-49, Kingsport, Tenn. 37660

Filed Aug. 15, 1973, Ser. No. 388,690

Int. Cl. C08f *21/00*

U.S. Cl. 260—861

No Drawing. 5 Pages Specification

Disclosed is a process for rapidly curing unsaturated polyester molding compositions wherein the unsaturated polyester is prepared from 2,2,4-trimethyl-1,3-pentanediol. According to the process of the invention there is contacted an unsaturated polyester prepared from 2,2,4-trimethyl-1,3-pentanediol, a monomer having at least one olefinic group copolymerizable with the unsaturated polyester and an admixture of equal molar quantities of styrene and maleic anhydride.